United States Patent [19]

Ohtani

[11] 4,326,177
[45] Apr. 20, 1982

[54] GAS LASER TUBE

[75] Inventor: Tetsuro Ohtani, Tokyo, Japan

[73] Assignee: Nippon Electric Co., Ltd., Tokyo, Japan

[21] Appl. No.: 103,892

[22] Filed: Dec. 17, 1979

[30] Foreign Application Priority Data

Dec. 15, 1978 [JP] Japan .............................. 53-156116
Dec. 15, 1978 [JP] Japan .............................. 53-156117

[51] Int. Cl.³ ............................................. H01S 3/03
[52] U.S. Cl. ........................................ 372/92; 372/98; 372/107
[58] Field of Search .................. 331/94.5 D, 94.5 C, 331/94.5 G

[56] References Cited

U.S. PATENT DOCUMENTS

| | | | |
|---|---|---|---|
| 3,851,275 | 11/1974 | Furuse et al. | 331/94.56 |
| 4,012,214 | 3/1977 | Furuse et al. | 65/34 |
| 4,064,466 | 12/1977 | Seki et al. | 331/94.5 D |
| 4,081,762 | 3/1978 | Golser et al. | 331/94.5 PE |
| 4,216,438 | 8/1980 | Seki et al. | 331/94.5 D |

*Primary Examiner*—William L. Sikes
*Assistant Examiner*—Leon Scott
*Attorney, Agent, or Firm*—Sughrue, Mion, Zinn, Macpeak & Seas

[57] ABSTRACT

Apparatus and method for a simple low cost gas laser tube wherein exhaust of the tube is accomplished by exhausting gas through spaces formed between a total reflection mirror and cylindrical support structure for the mirror mounted at one end of the tube to an exhaust pipe connected to the cylindrical structure and sealing said exhaust pipe.

12 Claims, 10 Drawing Figures

FIG. 1 PRIOR ART
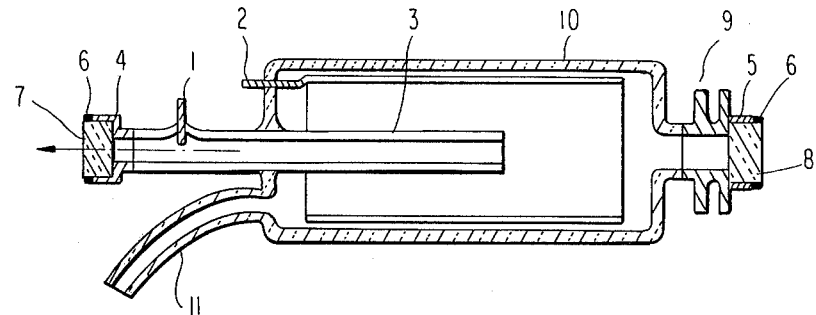
FIG. 2
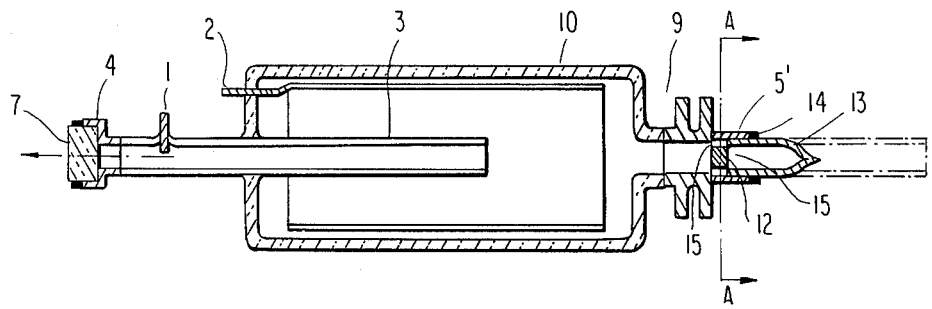
FIG. 4   FIG. 3   FIG. 5
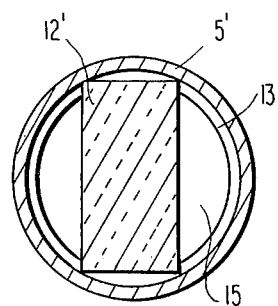 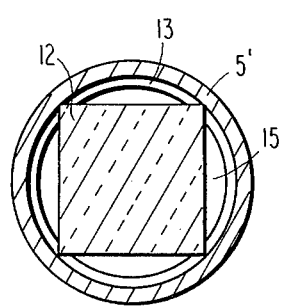 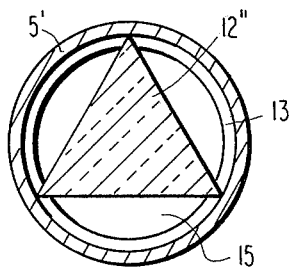

GAS LASER TUBE

BACKGROUND OF THE INVENTION

The present invention relates to a structure of a gas laser tube, and more particularly to a structure of an exhausting section of a gas laser tube.

In recent years, the fields of application He-Ne gas laser tubes have been more and more expanded, and a large of demand is expected, especially in point of sales (POS), information processing systems, video discs, etc. Therefore, laser tubes having a structure suitable for mass production and of low cost are required. Particularly desired are those laser tubes which are as simple as possible in structure and thus necessitate no special work for manufacture and which have a reduced number of manufacturing steps.

U.S. Pat. No. 4,081,762 discloses a structure of a gas laser tube which satisfies such requirements to a certain extent. In this gas laser tube, metal caps are provided at the opposite ends of a vacuum envelope disposed coaxially with a laser capillary, and at the central portions of these metal caps are respectively mounted via support members mirrors forming a resonator. In addition, an exhaust tube or vent is attached to one of the metal caps adjacent to the mirror support member. The exhaust tube is sealed off after evacuation. However, in this known gas laser tube, the exhaust tube is provided separately from the mirror support member, so that the work of fixing and sealing the mirror and the work of sealing the exhaust tube must be performed separately. Thus, this known gas laser tube has the disadvantage that the number of steps for manufacture is too large.

Another prior art internal mirror type He-Ne gas laser tube is shown in FIG. 1, which is disclosed in, e.g., U.S. Pat. No. 4,012,214. In this laser tube, a laser medium is generated by electric discharge within a laser capillary by applying an appropriate voltage between an anode electrode 1 and a cathode electrode 2. Laser light is taken out in the direction of the arrow by the action of an optical resonator composed of circular mirrors 7 and 8 which are air-tightly secured by glass solder 6 to cylindrical metallic members 4 and 5, respectively, at the opposite ends of the laser tube. A hollow metallic member 9 serves as means for adjusting alignment of the mirror axes. Exhaust of unnecessary gas from this laser tube is performed through an exhaust tube 11 planted at the shoulder portion of an envelope 10. However, connection to an exhaust apparatus and sealing off of the exhaust tube 11 depend entirely upon manual work employing a gas burner, which requires skilled operations, resulting in a increased costs due both to poor workability and limited workers. Since an exhaust tube made of glass is used and it is located at an inconvenient position, the yield of the coupling of the exhaust tube to an envelope is poor, and this is another cause of increased cost. In addition, breaking and cracks often occur at the exhaust tube itself.

SUMMARY OF THE INVENTION

It is one object of the present invention to provide a gas laser tube of low cost that is suitable for mass production.

Another object of the present invention is to provide a gas laser tube in which the number of component parts is reduced and also the number of steps for manufacture thereof is reduced.

In order to achieve the aforementioned objects, the present invention has the feature of use of an exhaust tube which also serves to fix and seal one or both of the mirrors forming an optical resonator.

According to one aspect of the present invention, there is provided a gas laser tube comprising a pair of mirrors forming an optical resonator one of which is a total reflection mirror held by a cylindrical member coaxially connected to one end of the gas laser tube and internally touching the cylindrical member, and an exhaust tube inserted into the cylindrical member so as to abut against the total reflection mirror and air-tightly secured to the end of the cylindrical member. After exhaust of the interior gas from the laser tube, the laser tube can be sealed off by compressing a part of the exhaust tube, where a metallic exhaust tube is employed. The total reflection mirror has such structure that a part of the mirror may touch internally with the cylindrical member and the other part may allow gas within the laser tube to pass upon exhaust; it is preferable that it has a square shape, though it may have another configuration. Preferable material for the exhaust tube is oxygen free copper or aluminum. However, the material of the exhaust tube is not limited to a metal and it is only necessary that it be a material that can be sealed and cut after exhaust of the interior of the laser tube and that can withstand a relatively high temperature.

According to another aspect of the present invention, there is provided a gas laser tube in which a total reflection mirror among a pair of mirrors forming an optical resonator is held by a cylindrical metallic member coaxially connected to the end of the gas laser tube, which comprises a mirror support member for supporting the total reflection mirror with a gas space retained between the cylindrical metallic member and the total reflection mirror, and an exhaust pipe coaxially inserted into the cylindrical metallic member so as to abut against the mirror support member and air-tightly secured to the end of the cylindrical metallic member. The exhaust pipe is preferably made of a material that can be cut by compression. The mirror support member is only required to have such structure that it supports the total reflection mirror while allowing gas to pass upon exhaust.

BRIEF DESCRIPTION OF THE DRAWINGS

FIG. 1 is a cross-sectional view of a prior art gas laser tube.

FIG. 2 is a cross-sectional view showing one preferred embodiment of the present invention.

FIG. 3 is a transverse cross-sectional view taken along line A-A in FIG. 2.

FIGS. 4 and 5 are transverse cross-sectional views showing modified embodiments provided with rectangular and triangular total reflection mirrors, respectively.

DESCRIPTION OF THE PREFERRED EMBODIMENT

Figure 6:
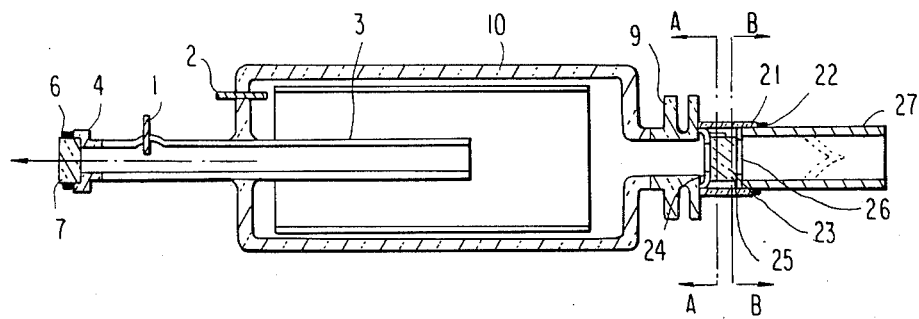
FIG. 6 is a cross-sectional view showing another preferred embodiment of the present invention.

FIG. 2 shows in longitudinal cross-section one preferred embodiment of the present invention. In this figure, component parts equivalent to those in the prior art gas laser tube shown in FIG. 1 are given the same reference numerals. In FIG. 2, reference numeral 5' designates a cylindrical metallic member having a longitudinal dimension larger than a thickness of a square shape total reflection mirror 12, which is positioned in such manner that its inside plane may abut at its four corners against an end surface of a hollow metallic member 9 and also may internally touch the cylindrical metallic member 5' at its four corners. Reference numeral 13 designates a metallic exhaust pipe, for example, of an oxygen-free copper pipe about 10 cm long, coaxially inserted into the cylindrical metallic member 5'. This metalic exhaust pipe 13 is air-tightly secured to the end portion 14 of the cylindrical metallic member 5' by any known means such as welding, brazing, soldering, etc. at such a lengthwise position that its end surface abuts against the four corners of the outside plane of the square total reflection mirror 12.

FIG. 3 shows a cross-section of the gas laser tube in FIG. 2 taken along line A-A, in which air within the laser tube can be exhausted through an air passageway 15. The relative positioning between the square shape total reflection mirror 12 and the hollow metallic member 9 is also such that an air passageway 15 may be formed therebetween. FIGS. 4 and 5 show other examples of the total reflection mirror. However, the total reflection mirror is not limited to the illustrated configurations, but it may take any other configuration so long as it can form an air passageway 15 as shown in FIGS. 2 to 5. The exhaust pipe is cut by compression after completion of the exhaust, at a position of about 1 cm from the fixed end portion 14.

Since the coaxial metallic exhaust pipe structure as described above is employed, exhaust of the laser tube does not require skilled operations either in mounting nor in sealing off; thus it can be performed very quickly without the risk of breaking, cracking, etc., and freedom in the direction of mounting of the laser tube to an exhaust apparatus is enhanced, so that automation of the work can be facilitated. In addition, of coupling a glass exhaust pipe and the work of sealing reflection mirrors in the prior art become unnecessary. Moreover, since the total reflection mirror is pressed from its opposite sides, deviation of the optical axis due to displacement of a mirror as often encountered in the prior art laser tube can be almost eliminated, and hence, alignment of the optical axis also becomes easy.

Figure 7:
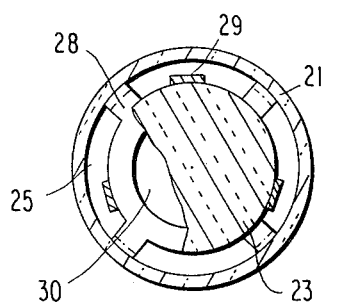
FIG. 7 is a transverse cross-sectional view partly cut away taken along line A-A in FIG. 6.
Figure 8:
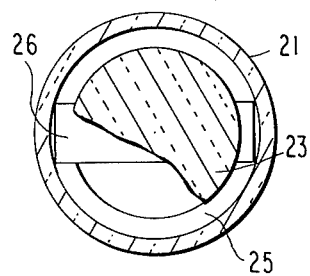
FIG. 8 is another transverse cross-sectional view partly cut away taken along line B-B in FIG. 6.

FIG. 6 is a longitudinal cross-section view showing another preferred embodiment of the present invention, and FIGS. 7 and 8 are transverse cross-section views partly cut away of the laser tube in FIG. 6 taken along lines A-A and B-B, respectively. Reference numeral 24 designates a first mirror support member including projections 28 for forming an air passageway 25 upon exhaust, mirror fixing projections 29 for holding a total reflection mirror 23 and an aperture 30 for passing a laser beam. This support member 24 is fitted in a cylindrical metallic member 21. Reference numeral 26 designates a second mirror support member which presses against the total reflection mirror 23 while forming an air passageway 25 for exhaust between the cylindrical metallic member 21 and exhaust pipe 27 and the total reflection mirror 23. The exhaust pipe 27 of about 10 cm long is inserted into the cylindrical metallic member 27 and butts against the second mirror support member 26 to fix the total reflection mirror 23. In the case where the exhaust pipe 27 is a glass pipe, it is air-tightly secured to the cylindrical metallic member by glass solder 22. In the case of a metallic exhaust pipe, it is fixedly secured as by welding, brazing, soldering, etc., and upon sealing off it is cut by compression. The configuration of the exhaust pipe 27 after completion of the sealing off is shown by dotted lines, which are positioned at about 1 cm from the end portion 22, in FIG. 6. It is a matter of course that mirror support means such as the first and second mirror support members 24 and 26 could be a combination of members of any arbitrary configurations, so long as they are constructed in such manner that they may form gap spaces for exhaust between the vacuum envelope composed of the hollow metallic member 9, cylindrical metallic member 21 and exhaust pipe 27 and the total reflection mirror 23 and also that they may have a function of holding the total reflection mirror 23 so that a laser beam can be projected on the surface of the total reflection mirror 23 on the side of the laser capillary 3. For instance, the mirror fixing projections 29 on the first mirror support member 24 could be provided on the second mirror support member 26, or two similar mirror support members 24 could be used in combination.

Figure 9:
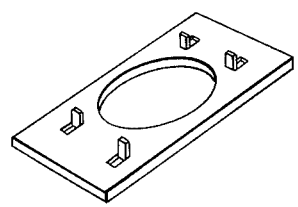
FIGS. 9 and 10 are perspective views showing modified embodiments of the mirror support member, respectively.
Figure 10:
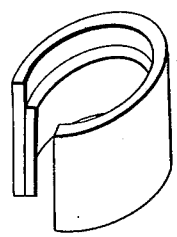

Other examples of the mirror support members are illustrated in FIGS. 9 and 10. It is to be noted that if necessary, a resilient material could be used for the mirror support members.

As described in detail above, according to the present invention, since a coaxial type of exhaust pipe structure is employed, automation of the exhaust of for laser tubes becomes very easy. Even in the case of hand-working, since the exhaust pipe is located at the best balanced position and can be made large in diameter, the invention is greatly effective for reducing the number of manufacturing steps and for preventing breaking of the laser tubes. Especially in the case of the metallic exhaust pipe, breaking and cracking at the portion of the exhaust pipe are eliminated. Moreover, the operation of coupling a glass exhaust pipe and the operation of sealing a total reflection mirror in the prior art become unnecessary. Furthermore, since the total reflection mirror can be held with a good precision by means of the mirror support members and the exhaust pipe, deviation of the optical axis due to displacement of mirrors which frequently occurred in the prior art laser tube, can be almost eliminated hence, the labor for adjusting alignment of optical axes for providing the maximum output can be also reduced.

As described above, according to the present invention, automation of manufacture of gas laser tubes can be easily achieved and thus lowering of a tube cost can be realized by mass production.

What is claimed is:

1. A gas laser tube comprising:
   an axially elongated gas-containing enclosure;
   a pair of mirrors disposed at the opposite ends of said enclosure and forming an optical resonator, at least one of which mirrors is a total reflection mirror;
   a cylindrical member axially disposed within and at one end of said enclosure holding said total reflection mirror with a gap space between at least one part of said total reflection mirror and said cylindrical member; and an exhaust pipe coupled coaxially to said cylindrical member and disposed oppositely in said enclosure with respect to said total reflection mirror, said exhaust pipe being air-tightly sealed-off and wherein said gap space provides a gas passageway between said enclosure and said exhaust pipe.

2. A gas laser tube as claimed in claim 1, in which said cylindrical member and said exhaust pipe are made of metal.

3. A gas laser tube as claimed in claim 2, in which said metal is oxygen-free copper.

4. A gas laser tube as claimed in claim 1 wherein the exhaust pipe is coaxially coupled to said cylindrical member.

5. A gas laser as claimed in claim 1 wherein an end portion of said exhaust pipe abuts and presses against the outside surface of said total inflection mirror.

6. A gas laser tube comprising, an axially elongated gas-containing enclosure, a pair of mirrors forming an optical resonator, at least one of said mirrors being a total reflection mirror, a cylindrical member coaxially connected to one end of the laser tube, mirror support means for holding said total reflection mirror so as to form gap spaces between said cylindrical member and said total reflection mirror, and an exhaust pipe fixedly secured to said cylindrical member and air-tightly sealed off.

7. A gas laser tube as claimed in claim 6, in which said cylindrical member and said exhaust pipe are made of metal.

8. A gas laser tube as claimed in claim 7, in which said metal is oxygen-free copper.

9. A gas laser tube as claimed in claim 6 wherein said exhaust pipe abuts said mirror support means to secure said total reflection mirror.

10. A gas laser tube as claimed in claim 6 wherein the exhaust pipe is coaxially coupled to said cylindrical member.

11. In a method of producing a gas laser comprising mounting in a laser tube a pair of mirrors forming an optical resonator at least one of which mirrors is a total reflection mirror the improvement comprising:

mounting said total reflection mirror in a cylindrical member such that there are gap spaces between the cylindrical member and the total reflection mirror;

coaxially connecting said cylindrical member and total reflection mirror to one end of said laser tube;

coaxially connecting to said cylindrical member an exhaust pipe;

exhausting said gas laser tube through said exhaust pipe; and air tightly sealing said exhaust pipe.

12. The method of claim 11 wherein said exhaust pipe is of metal and is ealed by mechanical compression thereof.

* * * * *

UNITED STATES PATENT AND TRADEMARK OFFICE
CERTIFICATE OF CORRECTION

PATENT NO. : 4,326,177
DATED : April 20, 1982
INVENTOR(S) : Tetsuro OHTANI

It is certified that error appears in the above—identified patent and that said Letters Patent is hereby corrected as shown below:

Column 3, line 19, delete "metalic" and insert -- metallic -- .

Column 4, line 2, delete "27" and insert -- 21 -- ;

line 35, after "of" delete "for" ;

line 51, after "eliminated" insert -- ; -- .

Column 6, line 27, delete "ealed" and insert -- sealed -- .

Signed and Sealed this

Sixth Day of July 1982

[SEAL]

Attest:

GERALD J. MOSSINGHOFF

Attesting Officer     Commissioner of Patents and Trademarks